Patented Apr. 21, 1936

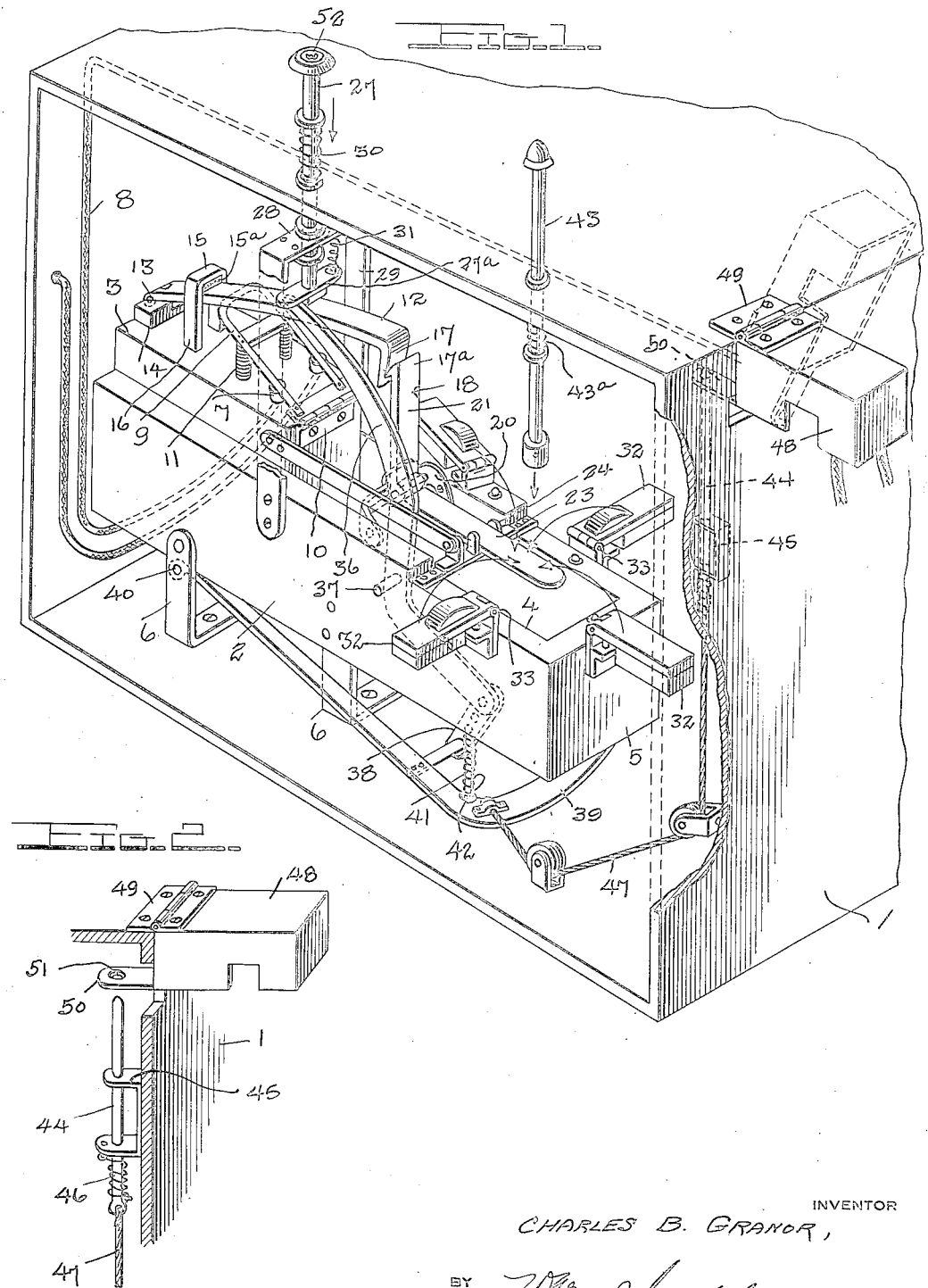

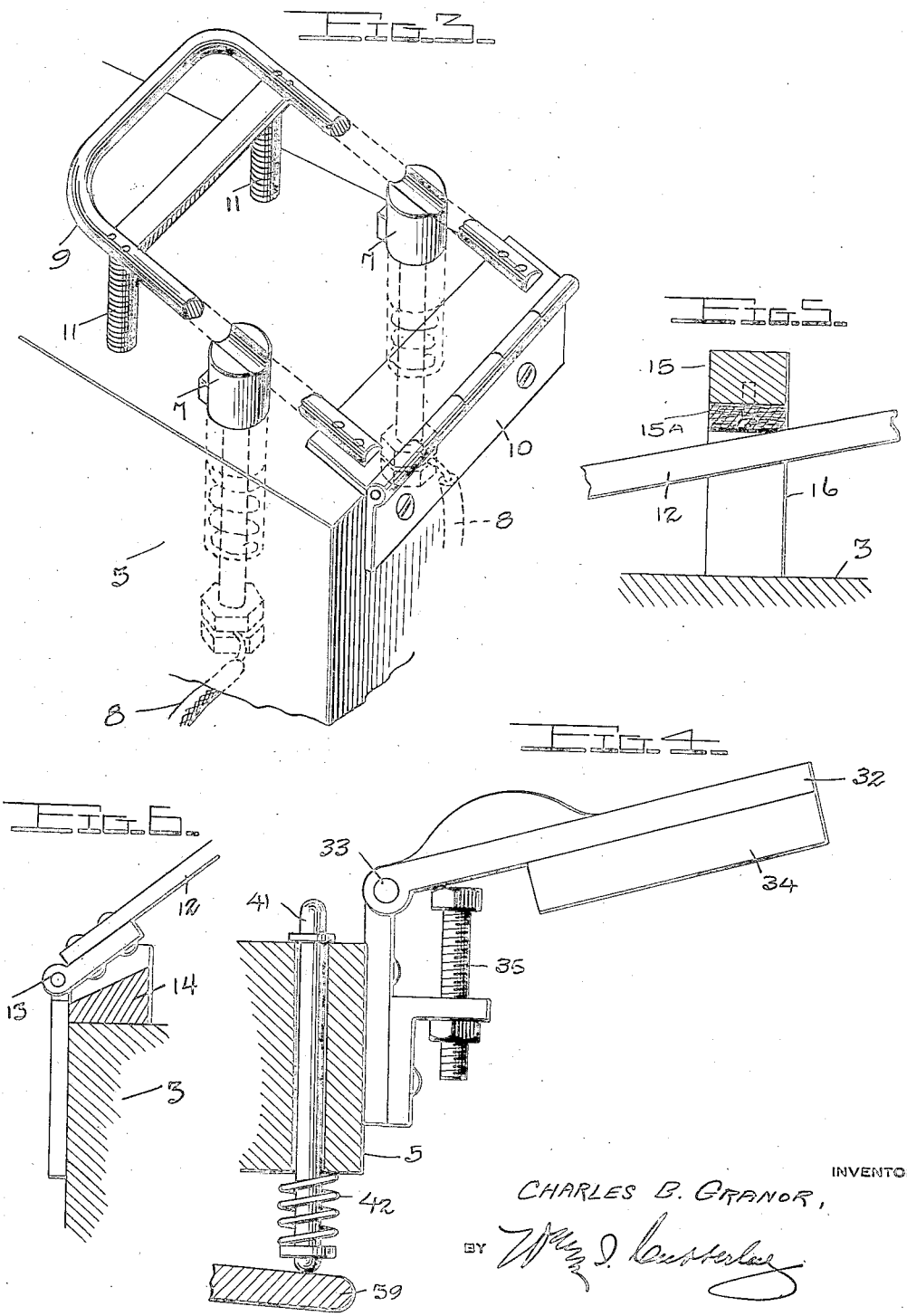

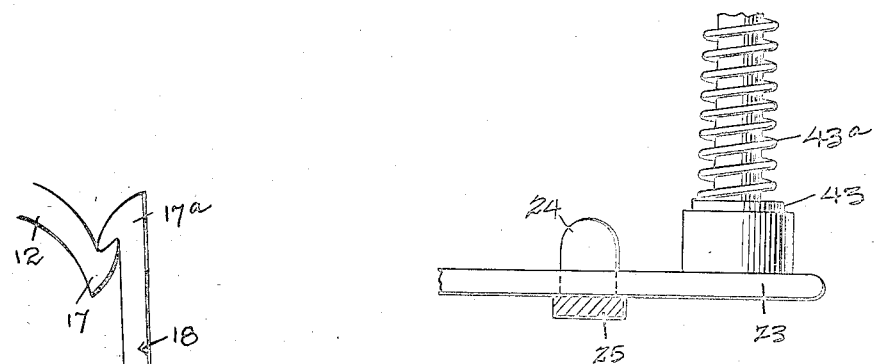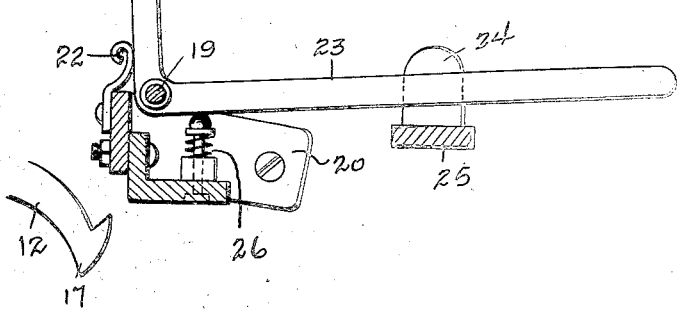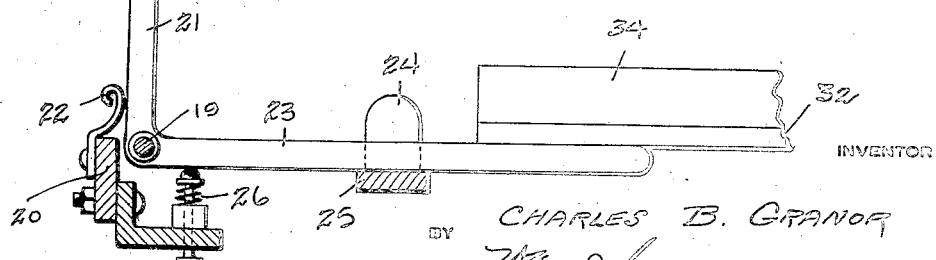

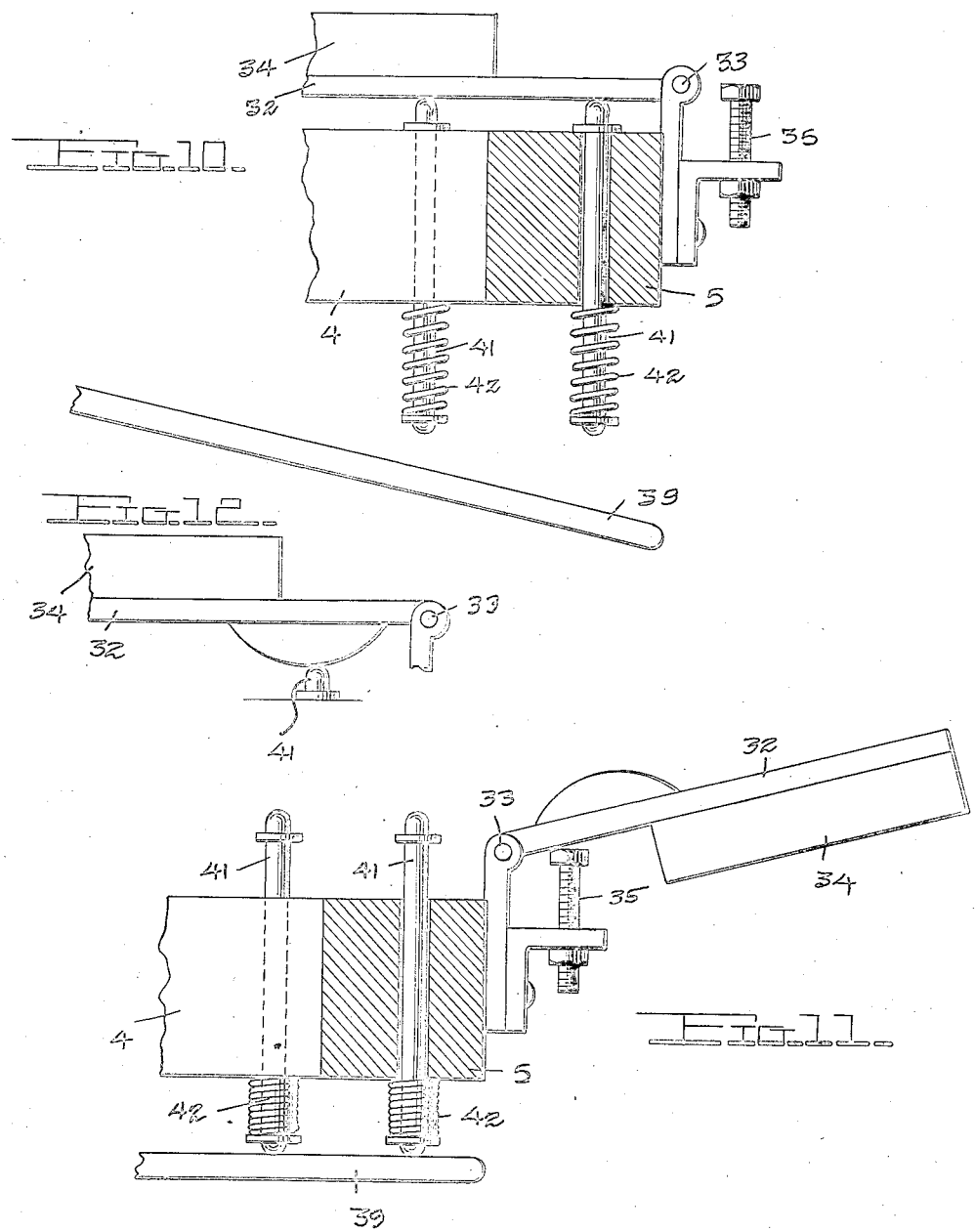

2,037,779

UNITED STATES PATENT OFFICE 2,037,779

SAFETY DEVICE FOR MOTOR VEHICLES

Charles B. Granor, Bridgeton, N. J., assignor of one-half to J. Jerome Katz and Samuel Granoff, both of Philadelphia, Pa.

Application January 18, 1934, Serial No. 707,177

5 Claims. (Cl. 200—52)

My present invention, in its broad aspect, has to do with improvements in devices for automatically cutting out the ignition of a motor vehicle in the event the vehicle turns turtle or turns over, or when the vehicle collides with another vehicle or object, and also for cutting out the ignition when the driver sees that an accident impends, and to disconnect the ignition to prevent theft of the car. My invention is designed for use with trucks, tractors, passenger vehicles of all kinds, and in conjunction with any other type of vehicle driven by motor power.

Without the use of any form of safety device for cutting out the ignition, the power plant of a motor vehicle ordinarily continues to function after a vehicle overturns, or after it collides with another vehicle or object. As a result many fatalities occur due to the activity of the power plant after collision or after a vehicle overturns which could be avoided if the ignition is cut out. For instance, certain types of tractors are especially liable to kill or main the driver due to activity of the power plant after overturning, and a number of devices have been suggested and tried out with unsatisfactory results. There are, for instance, mercury and water level controlled ignition cut-outs; those functioning through the operation of a dead weight or pendulum, and the like. The principal disadvantage of these is that they are influenced by ordinary road jolts and the like, and are a source of continual annoyance to the vehicle operator. A satisfactory device for this purpose must have at least three requisites; it must be positive and fool proof in operation, and must be certain in its operation; it must be relatively inexpensive to manufacture and install and not necessitate radical changes in the structural design of the vehicle or power plant, and it must operate only if and when an accident occurs or the vehicle overturns. It is believed that my present invention accomplishes all of these purposes, and many others as will be seen.

My invention is so constructed that it is impossible to operate it accidentally through road jolts, since the actuating devices will not come into operation or be influenced until a certain point is reached in the angle to which the vehicle may be tilted, and this angle is adjustable. Furthermore, my invention is so formed and constructed that the impact of a collision with another vehicle or with an object will cause it to operate and disconnect the ignition. In addition to these features, I have provided means whereby the device may be manually controlled by the operator of the vehicle to throw out the ignition in case he sees an accident impending or in case of fire, and there are provided means for throwing out the ignition to prevent theft of the vehicle. All of these functions and purposes are positive, fool proof, and certain in operation, and practice demonstrates that a vehicle equipped with my invention will be safeguarded with absolute certainty under all conditions, and my invention may be installed in any convenient place without modifying or changing or otherwise disarranging the conventional vehicle structure or power plant.

Other and equally important objects and advantages of my invention may be briefly summarized as follows: first, I provide what may be termed a trigger action for setting and cutting out the ignition, and this is actuated by separate actuating means automatically operable under two conditions; i. e. when the angle of tilt of the vehicle reaches a certain predetermined point, and when the vehicle suffers sufficient impact such as in collision; second, there are no parts which are liable to get out of order, and the device may be depended upon to operate with certainty on all normal occasions; third, means are provided for manually setting my device, and other means are provided for disconnecting the ignition circuit through my device thereby to prevent theft of the vehicle; fourth, my invention may be installed at any convenient place on a vehicle without changing in any way the structure of the vehicle itself or its power plant, and fifth, ordinary wear and tear and time will not affect the operation of my device so that it may be depended upon with certainty.

Other and equally important objects and advantages will appear as the detailed description of the invention proceeds, but since certain changes in form, size, position, and arrangement of the parts illustrated and described herein may be made without departing from the spirit of the invention, it is to be understood that these are permissible and contemplated provided they fall within the scope of what is claimed.

In the drawings wherein is illustrated the preferred form of my invention:—

Figure 1 is an assembly view of my invention, partly broken away, and in perspective to show the arrangement and operation of the several parts thereof;

Figure 2 is a detail perspective view of the lock and cap for a battery for interrupting the battery contacts;

Figure 3 is a detailed perspective view of the switch and contacts;

Figure 4 is a view of one of my hammers in a passive position;

Figure 5 is a view of the keeper, felt pad and the switch trigger member;

Figure 6 is a view of the hinge and hinge block and the switch trigger member partly in section;

Figure 7 is a detailed view of the trigger members interengaged to close the circuit;

Figure 8 is a detailed view of the trigger members disengaged to permit the switch to move away from the contacts;

Figure 9 is a view of the push rod for tripping the bell-crank trigger member to break the circuit in case of fire or the like;

Figure 10 is a view of the hammers engaging the pins used to throw the hammers back in passive position;

Figure 11 is a view showing the hammer resetting device engaging the resetting push-pins;

Figure 12 is a view of a hammer provided with an enlarged part on its under side to properly engage the pins.

In the drawings, like characters of reference are used to designate like or similar parts throughout the several views.

Before describing the several parts of my invention in detail it is to be noted that the device is to be leveled and positioned on the vehicle, and that should a fire break out in the vehicle, such as might be due to backfiring and a leaky carburetor, the entire ignition system can be cut out so that danger of the machine burning up is considerably lessened. So also the various manual control handles can be suitably marked to indicate their uses.

It is to be understood that my invention may be positioned at any suitable place on a motor vehicle, and all of its several parts are housed and retained in a housing or casing (1) which has four sides, a top and a bottom. If my invention is placed adjacent to the battery which under certain circumstances may be desirable a hinged battery cover may be provided with contact points.

Referring now to Figure 1 which illustrates in perspective an assembly view of my invention with its parts in normal operative position; there is provided a frame (2) having a relatively solid raised part (3), side bars (4) and an end piece (5); the frame is mounted on suitable legs (6) which are attached to the bottom of the housing or casing (1). On the solid raised part (3) are two spring seated, slightly resilient contact points (7) for the positive and negative wires in the ignition system (8) of the vehicle power plant; these may be cut into the ignition line at any suitable place, and of course the circuit is completed only when the contact points are engaged by a switch element. I provide a U-shaped switch element (9) which is hinged at (10) to the frame part (3) and which is normally urged upwardly and away from the contact points (7) by coil springs (11); thus to complete the circuit for normal operation of the motor vehicle the switch element must be in engagement with the contact points as shown in Figure 1. Engaging the switch element (9) is a trigger member (12) which is hinged at one end (13) to the frame element (3) and hinge block (14), so that the switch element (9) and trigger member (12) are respectively hinged to opposite ends of the frame element (3) to swing into position with the trigger element above and in engagement with the switch element so that pressure on the trigger element or member (12) will press the switch element (9) into engagement with the contact points (7). Upward movement of the trigger member is limited by engagement with the felt or resilient pad (15a) on the under side of the top bar (15) of the keeper (16). The free end of the trigger element or member (12) is formed with a hook (17) which normally engages in the hooked end (17a) of a cooperating trigger member (18), which is right-angular in shape (in the nature of a bell-crank lever) and pivoted at (19) on a bracket (20) mounted between the side bars (4) of the frame. In this position the trigger member (12) holds the switch on the contact points, and this is the normal position when the device is set.

The forward movement of the upstanding arm (21) of trigger member (18) is limited by a slightly resilient stop (22) and the horizontal arm (23) of the trigger member extends out between the side bars (4) and swings between the upstanding guides (24) on a transverse bar (25) which intercepts the path of downward movement of arm (23) and limits its movement; when the two trigger members are engaged the trigger member (18) is swung forward and the horizontal arm (23) is not in engagement with bar (25). The trigger member (18) is normally urged forward by a spring pressed pin (26) engaging beneath the arm (23) and carried by a fitting on the bracket (20), so that in order to set my device it is merely necessary to press down on the trigger member (12) in which case the trigger member (18) will automatically engage the same to hold the switch member (9) on the contact points (7).

In order to set my device, I provide a push bar (27) which extends up through the top of casing (1) and down through a suitable bearing member (28) on the support (29) attached to the frame (2); this push bar (27) is normally pressed by the spring (30) upwardly and out of engagement with the trigger member (12), and a supplementary coil spring (31) is also provided to position the push bar with certainty. To set my device, the push bar is simply pushed down to engage the trigger members and hold the switch on the contact points. It will therefore be seen that to break the ignition circuit it is merely necessary to disengage trigger element (18) from trigger member (12) in which case the trigger member (12) and switch (9) will be forced up by springs (11) and out of contact with the points (7).

To accomplish this end, i. e., to cut out the ignition circuit, I provide a plurality of hinged weighted arms (32), preferably four in number as shown, which are so positioned and formed that any arm when swung in will engage the horizontal arm of trigger member (18).

Each arm (32) is hinged as at (33) to the frame (1) and the free end is weighted as at (34) so that when an arm strikes the trigger member (18) a sufficiently hard blow will be struck to disengage the respective hooked ends (17) and (17a) of the trigger members. The normal position of rest of the weighted arms (which will hereinafter be called hammers) is determined by an adjustable screw (35) so that the point at which any hammer will be swung over to engage the trigger member (18) is determined by the position of that arm when at rest.

It will be understood that my device is leveled up when attached to a vehicle, and that the positions of the hammers are then adjusted so that the respective hammers will be thrown to engage the trigger member when the vehicle (and the casing 1) are tilted beyond the predetermined point, or sufficient impact is applied to the vehicle to upset or move the hammers to engage the trigger member (18). Manifestly the hammers are not influenced by road jolts, or any other instrumentalities except tilting beyond the predetermined point or a violent impact.

Since in order to set my device all of the hammers must be returned to the position of rest shown in Figure 1, I have provided a lever (36) which is pivoted at (37) to the frame and which extends into the path of the push bar or rod (27), and above the trigger member (12) so that the head (27a) of the push rod will engage the lever (36) first on its downward movement. This lever (36) connects with a depending adjustable short lever (38) which is coupled with a U-shaped hinged pedal member (39); the member (39) is hinged to the frame at (40) as shown and normally extends at an angle downwardly. The weight of the member (39) normally holds the lever (36) in its upwardmost position as shown in Figure 1. There are provided a plurality of push-pins (41) in openings in the frame (1); one push-pin beneath each hammer (32), and each has a spring (42) which normally holds it out of the path of the hammer. The lower ends of the push-pins extend down below the frame to a point near the member (39) so that when the member (39) is actuated upwardly by pressing the lever (36) the push-pins are engaged and moved upwardly against the pressure of springs (42) to strike the hammers (32) and swing them back into their position of rest shown in Figure 1, and certain of the hammers have enlarged parts so that the pins strike the hammers together.

The operation of my device is as follows: assuming that the triggers are disengaged, and all of the hammers, or some of them, are engaged with the horizontal arm (23) of trigger member (18), which would be the relative positions of the parts after a collision or the like, and the switch member (9) out of engagement with the contact points (7) with the power plant ignition cut-out; the push rod (27) is forced down. The head (27a) of push-rod first meets the lever (36) which actuates member (39) and push-pins (41) to return the hammers (32) to their normal position of rest; then as the pressure on push-rod (27) is continued it engages the trigger member (12)—forcing the same down until (17) and (17a) are reengaged, and the switch element (9) moved to reengage contact points (7); the circuit is then completed and the device set for action.

Since it is oftentimes desirable to quickly cut out the ignition when an accident or the like is contemplated I provide a second push-rod (43) which is normally urged to a position of rest by spring (43a) and which is positioned directly above the horizontal arm of trigger member (18), so that by pressing upon push rod (43), the trigger element (18) will be tripped to release trigger element (12) so that the switch (9) will fly up from the contact points (7) and cut out the ignition circuit.

Furthermore, it is desirable that the vehicle at times be rendered theft-proof; and to attain that end I provide a sliding rod (44) attached to the end wall of the casing (1) by a bracket (45) and normally forced upwardly by a spring (46). This rod is connected by a flexible connection (47) with the member (39). A battery terminal cap (48) is hinged to casing (1) as at (49), and has an extension (50) which passes through an opening into the interior of the casing (1) when the cap is down and the battery terminal engaged. This extension has an opening (51) into which the end of the sliding rod (44) fits to normally lock the battery cap into position to complete the battery circuit. When the push rod (27) is pressed the member (39) is actuated and this pulls on the flexible connection (47) to pull the sliding rod (44) out of engagement with extension (50) thereby releasing the battery cap so that the connection at the battery will be severed. In practice when the battery cap is unlocked it may be either lifted by hand as shown, or spring pressed upwardly. To further insure against completing the circuit in the absence of the operator, the push rod (27) has a key lock (52) so that it may be locked in inoperative position.

The device may be immediately reset after a car has overturned by simply pushing down on the push rod (27) without any delay such as would occur with a liquid level apparatus while the liquid content of a liquid level device is returning to a state of rest, or while a pendulum device ceases vibration, or a weight device is readjusted to a circuit closing position.

I claim:—

1. A safety device for motor vehicles, comprising a switch element interposed in the battery circuit, a spring normally urging the switch element to its open position, normally interengaging trigger devices, one engaging the switch element to hold it closed, a plurality of pivoted hammers fulcrumed to strike at a substantially common point upon the other trigger device when the vehicle is subject to high impact or is tilted to a predetermined angle to release the first trigger and permit the switch to take its open position breaking the battery circuit.

2. A safety device for motor vehicles, comprising a spring released switch element interposed in the battery circuit, a lever engaging the switch element to close it, another lever engaging the first lever to hold it in closing position with respect to the switch element, and a plurality of weighted members pivoted to swing independently into contact with the second lever to move the same to release the first lever and permit the switch to open when the vehicle is subject to excessive impact or is tilted beyond a predetermined angle.

3. A safety device for motor vehicles, comprising a spring released switch element interposed in the battery circuit, a pair of trigger arms having interengaging hooked ends, one trigger arm engaging the switch to hold it closed, and a plurality of hammers pivoted independently of each other to swing against the other trigger arm when the vehicle is subject to impact or tilting, to move the same to release the hooked ends, and disengage the other trigger arm to open the switch and break the circuit.

4. A device of the character described, comprising a switch device interposed in the ignition system of a motor vehicle, means for automatically moving the switch to an open position, a trigger device for holding the switch closed, manual means for setting the trigger device, manual means for releasing the trigger device, and a plurality of independently operable hammers pivotally mounted to swing to a position to strike the trigger device to release the same when the vehicle is subject to excessive impact or a predetermined angle of tilt, and means for returning the hammers to their normal position of rest.

5. A device of the character described, comprising a housing, a frame in the housing, switch contacts on the frame interposed in the battery circuit of a motor vehicle, a switch, springs normally holding the switch in open position, a pivoted lever constituting one element of a trigger member operating to close the switch, another trigger element engaging said lever to hold the same in position to close said switch, a plurality of pivoted weight devices arranged in pairs substantially opposite each other for releasing the last mentioned trigger element from engagement with the lever constituting the first trigger element to permit said switch to open, means for resetting the weights, means for resetting the respective trigger elements to close the switch; battery connections, and means in conjunction with the means for resetting the weights for interrupting the battery connections.

CHARLES B. GRANOR.